US010120088B2

(12) United States Patent
Jurok et al.

(10) Patent No.: US 10,120,088 B2
(45) Date of Patent: Nov. 6, 2018

(54) CABLELESS SEISMIC SENSORS AND METHODS FOR RECHARGING

(71) Applicant: CGG SERVICES SA, Massy (FR)

(72) Inventors: Jason Jurok, East Grinstead (GB); Peter Maxwell, Missouri City, TX (US); Jonathan Grimsdale, Orsay (GB)

(73) Assignee: CGG SERVICES SAS, Massy (FR)

( * ) Notice: Subject to any disclaimer, the term of this patent is extended or adjusted under 35 U.S.C. 154(b) by 163 days.

(21) Appl. No.: 15/117,510

(22) PCT Filed: Feb. 4, 2015

(86) PCT No.: PCT/IB2015/000268
§ 371 (c)(1),
(2) Date: Aug. 9, 2016

(87) PCT Pub. No.: WO2015/121749
PCT Pub. Date: Aug. 20, 2015

(65) Prior Publication Data
US 2016/0363679 A1 Dec. 15, 2016

Related U.S. Application Data

(60) Provisional application No. 61/954,618, filed on Mar. 18, 2014, provisional application No. 61/938,711, filed on Feb. 12, 2014.

(51) Int. Cl.
*G01V 1/22* (2006.01)
*G01V 1/24* (2006.01)
(Continued)

(52) U.S. Cl.
CPC ............. *G01V 1/247* (2013.01); *G01V 1/162* (2013.01); *G01V 1/22* (2013.01); *G01V 1/168* (2013.01);
(Continued)

(58) Field of Classification Search
CPC .......... G01V 1/162; G01V 1/22; G01V 1/247; G01V 1/184; G01V 1/168; G01V 2210/1425
See application file for complete search history.

(56) References Cited

U.S. PATENT DOCUMENTS 7,324,406 B2 * 1/2008 Berg ..................... G01V 1/16
181/120
8,228,759 B2 * 7/2012 Ray ...................... G01V 1/223
367/77
(Continued)

FOREIGN PATENT DOCUMENTS

GB 2482584 A 2/2012

OTHER PUBLICATIONS

International Search Report in related International Application No. PCT/IB2015/000268, dated Nov. 3, 2015.
(Continued)

*Primary Examiner* — Krystine E Breier
(74) *Attorney, Agent, or Firm* — Patent Portfolio Builders PLLC

(57) ABSTRACT

A seismic data acquisition system includes a recording unit to record acquired seismic data and ground equipment containing surface units and wireless field digitizer units. Each surface unit is in communication with the recording unit and contains a first wireless communication module and a power supply mechanism transmitter coil. Each wireless field digitizing unit includes a seismic sensor unit, a second wireless communication module in communication with the seismic sensor unit and one of the first wireless communication modules to exchange digital data between the first and second wireless communication modules and a power supply mechanism receiver coil. The power supply mechanism receiver coil is magnetically coupled to the power supply
(Continued)

mechanism transmitter coil in one of the surface units to transmit electrical energy wirelessly from the surface unit to the wireless field digitizer.

20 Claims, 8 Drawing Sheets

(51) Int. Cl.
  *G01V 1/16* (2006.01)
  *G01V 1/18* (2006.01)
(52) U.S. Cl.
  CPC ...... *G01V 1/184* (2013.01); *G01V 2210/1425* (2013.01)

(56) References Cited

U.S. PATENT DOCUMENTS

| | | | | |
|---|---|---|---|---|
| 8,577,288 | B2* | 11/2013 | Rhodes | H04B 11/00 455/40 |
| 2004/0105533 | A1* | 6/2004 | Iseli | G01V 1/003 379/106.01 |
| 2008/0137484 | A1* | 6/2008 | Scott | G01V 1/184 367/188 |
| 2011/0032794 | A1* | 2/2011 | Rhodes | G01V 1/22 367/15 |
| 2011/0096628 | A1 | 4/2011 | Golparian | |
| 2012/0250457 | A1 | 10/2012 | Rickert, Jr. et al. | |
| 2013/0207603 | A1* | 8/2013 | Kappeler | H01P 7/00 320/108 |
| 2013/0221911 | A1* | 8/2013 | Low | H02J 5/005 320/108 |
| 2014/0292495 | A1* | 10/2014 | Christiansen | E21B 17/006 340/10.34 |
| 2015/0091496 | A1* | 4/2015 | Meunier | H02J 7/025 320/106 |
| 2017/0040826 | A1* | 2/2017 | Arendarik | H02J 50/10 |
| 2017/0075014 | A1* | 3/2017 | Westerdahl | G01V 1/3852 |

OTHER PUBLICATIONS

Written Opinion of the International Searching Authority in related International Application No. PCT/IB2015/000268, dated Nov. 3, 2015.

* cited by examiner

CABLELESS SEISMIC SENSORS AND METHODS FOR RECHARGING

CROSS-REFERENCE TO RELATED APPLICATIONS

This application claims priority and benefit from U.S. Provisional Patent Application No. 61/938,711, filed on Feb. 12, 2014, entitled "Wireless FDU with Integrated Sensor", and U.S. Provisional Patent Application No. 61/954,618, filed on Mar. 18, 2014, entitled "Method of Recharging Cableless Seismic Sensors", the disclosures of which are incorporated here by reference.

TECHNICAL FIELD

Embodiments of the subject matter disclosed herein generally relate to methods and systems for seismic data acquisition and, more particularly, to seismic data acquisition systems.

BACKGROUND

Seismic data acquisition and processing techniques are used to generate a profile (image) of a geophysical structure (subsurface) of the strata underlying the land surface or seafloor. Among other things, seismic data acquisition involves the generation of acoustic waves, the collection of reflected/refracted versions of those acoustic waves, and processing the collected seismic data to generate the image. This image does not necessarily provide an accurate location for oil and gas reservoirs, but it may suggest, to those trained in the field, the presence or absence of oil and/or gas reservoirs. Thus, providing an improved image of the subsurface in a shorter period of time is an ongoing process in the field of seismic surveying.

In the age of large channel count seismic crews it is becoming increasingly difficult to realize high productivity while constrained by current field deployment techniques. In addition to improving productivity, there is also an almost constant search to improve sensor coupling and reduce spread noise. The issue is that simple forms of productivity improvement do not necessarily translate into better data quality.

Reduction of human interaction associated with field deployment techniques can be achieved through the reduction of the electrical connections between sensors and the acquisition system, for example, through the use of short cable segments and integrated connectors that have an arrangement which keeps the sand out. The resulting reduction in electrical connections significantly simplifies the sensor deployment method, facilitating mechanized deployment.

Early ideas of mechanized or automated deployment centered on affixing sensors to an acquisition cable. Each sensor would have a short cable segment, referred to as a stringer that would mate to a digitizing module or digitizing unit (DU) on the acquisition cable. Initially, significant time is spent attaching the sensors to the acquisition cable through this arrangement of stringers and DUs. Once attached, the sensors remain connected at all times. The resulting arrangement requires the entire assembly to be wrapped onto a large spool for deployment or wound into a bin, for example in a figure-eight arrangement.

Given the directionality of the sensors, planting the sensors so that all sensors end up planted with some consistency is difficult to manage. The acquisition cable inevitably twists during the spooling efforts, and the layout crew spends a significant amount of time righting the sensors. In addition to the time concerns, the resulting spools or bins of equipment are bulky and difficult to manage as the individual sensors are heavy. Efficient trouble shooting and field repairs are difficult given that replacing even a single sensor requires removing and re-applying all of the tape and zip ties. One alternative to this arrangement is a gimbaled sensor; however, gimbaled sensors are not known for reliability.

Electrically disconnecting the sensor from the acquisition system has its own challenges to consider. For example, in order to maintain fidelity the analog sensor data need to be digitized and transferred to the recording unit. Therefore, structures are desired that provide a wireless communication link between a sensor and a DU. These structures would provide the required power to the sensor and DU through either a continuous power source or a battery. Conventional batteries, however, are costly, voluminous and require recharging. Therefore, improved rechargeable batteries and an adequate method for recharging the batteries are also desired.

SUMMARY

Exemplary embodiments are directed to wireless or connectionless seismic sensors that combine a digitizing unit (DU) or field digitizing unit (FDU) with a sensor through a short range, low power, communication link. The result is a seismic acquisition system having a combined wireless DU (WDU) or wireless FDU (WFDU) and wireless sensor that can acquire the desired seismic data and communicate the data to the seismic recorder through a surface unit and telemetry and power cable to a recoding unit. The combined WFDU and wireless sensor and surface unit form the ground stations of the acquisition system. The combined WDU or WFDU and wireless sensor requires very little electrical energy to operate. Thus, power can be supplied from a battery, wireless power transfer from the surface unit or telemetry and power cable or a combination of both. Suitable wireless power transfer arrangements include inductive charging. Preferably, wireless power transfer achieved through highly resonant wireless power transfer (HR-WPT) in the ground stations. The HR-WPT uses two matched magnetically coupled resonant circuits, one in the combined WFDU and wireless sensor and one in the surface unit, to efficiently transfer energy over a distance of up to 12 inches (30 cm) through a variety of substrates.

In one embodiment, very low capacity batteries are used in the combined WFDU and wireless sensor. These very low capacity batteries are continuously or permanently recharged by electromagnetic radiation from a transmitter in the telemetry and power cable located nearby. Recharging batteries using magnetic induction is already well known. However, the range is extremely limited. Transmitting energy with electromagnetic (EM) waves provides an improvement over the ranges achievable with inductive coupling or inductive charging, facilitating a range of up to a few meters. Operationally, the number of channels deployed or retrieved daily is increased using these wireless arrangements while reducing the number of personnel required for deployment.

Exemplary embodiments are directed to a wireless field digitizer unit containing a seismic sensor unit configured to output a digital channel of seismic data, a wireless communication module in communication with the seismic sensor unit and a power supply mechanism in communication with the seismic sensor unit and wireless communication module. The power supply mechanism is sufficient to supply all required power of the wireless field digitizer, and the wireless communication module communicates the digital channel of seismic data wirelessly to a wired surface unit in a seismic data acquisition system.

In one embodiment, the seismic sensor unit includes three digital accelerometers arranged along three orthogonal axes. The seismic sensor unit performs alignment correction for the wireless field digitizer about the three orthogonal axes and outputting the single digital channel of seismic data. In one embodiment, the wireless communication module is a self-connecting and self-pairing wireless communication module. Suitable wireless communication modules include, but are not limited to, a radio wave communication module, an ultrasonic communication module, an inductive coupling communication module, an optical communication module, a cellular network communication module and an acoustic communication module.

In one embodiment, the power supply mechanism is a wireless non-resonant inductive coupling mechanism. In one embodiment, the power supply mechanism is a wireless resonant inductive coupling mechanism, for example, having a plurality of coils arranged with divergent magnetic axes. In one embodiment, the power supply mechanism includes a battery and a wireless power transfer mechanism in communication with the battery to charge the battery continuously. The wireless field digitizer can also include a housing with at least one of the seismic sensor unit, wireless communication module and power supply mechanism disposed within the housing. In one embodiment, the housing is a cylinder having at least one helical ridge extending along a length of the cylinder. In another embodiment, the housing is a cylinder having two hemispherical ends, and the power supply mechanism includes at least three coils arranged with divergent magnetic axes. In one embodiment, the housing is a sphere, and the power supply mechanism includes six coils with each coil disposed on a printed circuit board and the printed circuit boards arranged as a rectangular box within the sphere.

Exemplary embodiments are also directed to ground equipment for use in a seismic data acquisition system. The ground equipment includes a surface unit having a first wireless communication module and a power supply mechanism transmitter coil and a wireless field digitizer unit having a second wireless communication module in communication with the first wireless communication module to exchange digital data between the first and second wireless communication modules. The wireless field digitizer unit also includes a power supply mechanism receiver coil. The power supply mechanism receiver coil is magnetically coupled to the power supply mechanism transmitter coil to transmit electrical energy wirelessly from the surface unit to the wireless field digitizer. The wireless field digitizer unit is separate from and physically disconnected from the surface unit.

In one embodiment, the surface unit further also includes a battery in communication with the power supply mechanism transmitter coil to supply continuous power to the power supply mechanism transmitter coil and at least one photovoltaic cell in communication with the battery to charge the battery continuously. In one embodiment, the surface unit includes a plurality of power supply mechanism transmitter coils arranged with divergent magnetic axes. The power supply mechanism transmitter coils and the power supply mechanism receiver coil are magnetically coupled coils tuned to resonate at a common frequency.

Exemplary embodiments are also directed to a seismic data acquisition system containing a recording unit to record acquired seismic data and ground equipment. The ground equipment includes a plurality of surface units and a plurality of wireless field digitizer units. Each surface unit is in communication with the recording unit and includes a first wireless communication module and a power supply mechanism transmitter coil. Each wireless field digitizing unit includes a seismic sensor unit, a second wireless communication module in communication with the seismic sensor unit and one of the first wireless communication modules to exchange digital data between the first and second wireless communication modules and a power supply mechanism receiver coil. The power supply mechanism receiver coil is magnetically coupled to the power supply mechanism transmitter coil in at least one of the surface units to transmit electrical energy wirelessly from the surface unit to the wireless field digitizer.

In one embodiment, the seismic data acquisition system of claim includes at least one telemetry cable in communication with the recording unit and each one of the plurality of surface units to communicate data from the surface units to the recording unit and at least one power cable in communication with the recording unit and each one of the plurality of surface units to supply power to the plurality of surface units. In one embodiment, the ratio of surface units to wireless field digitizer units is less than 1:1. In one embodiment, the seismic data acquisition system of claim utilizes mechanized deployment and recovery equipment to insert each one of the plurality of wireless field digitizer units a desired distance below ground and to remove the plurality of wireless field digitizer units from the desired distance below ground.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. Some of the following embodiments are discussed, for simplicity, with regard to local activity taking place within the area of a seismic survey. However, the embodiments to be discussed next are not limited to this configuration, but may be extended to other arrangements that include regional activity, conventional seismic surveys, etc.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
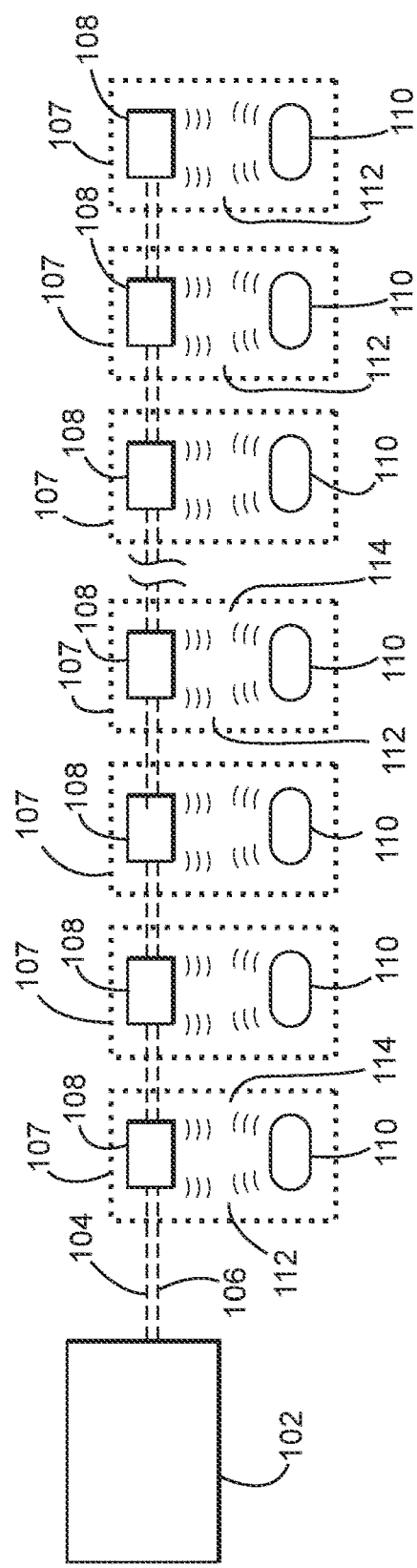
FIG. 1 is a schematic representation of an embodiment of a seismic data acquisition system in accordance with the present invention.

Referring initially to FIG. 1, exemplary embodiments are directed to a seismic data acquisition system 100 having at least one recording unit 102 to record seismic data acquired by the seismic data acquisition system. Ground equipment 107 is also included in the seismic data acquisition system. As illustrated, the ground equipment includes a plurality of pairs of surface units 108 and wireless field digitizer units 110. Therefore, each wireless field digitizer unit communicates with one of the surface units, for example, the surface unit in closest physical proximity after deployment of the ground equipment. Alternatively, the ratio of surface units to wireless field digitizer units is less than 1:1. Therefore, two or more wireless field digitizer units may communicate with and receive power from a single surface unit. This also provides for robustness and redundancy in the ground equipment, as failure or misalignment of one surface unit can be compensated for by other adjacent surface units.

In general, each wireless field digitizer unit is separate from and physically disconnected from its associated surface unit. A given wireless field digitizer unit communicates with a given surface unit through a wireless data communication link 112 and receives power from a given surface unit through a wireless power transmission link 114.

Each surface unit in the ground equipment is in communication with the recording unit. This communication can be wired or wireless, for example through a cellular communication link. In one embodiment, the seismic data acquisition system includes at least one telemetry cable 104 in communication with the recording unit and each one of the plurality of surface units in order to communicate data from the surface units to the recording unit. Alternatively, a plurality of telemetry cables are used to provide for the arrangement and coverage of ground equipment desired in the seismic data acquisition system. Suitable telemetry cables include, but are not limited to, electrical or electronic cables and fiber optical cable.

The surface units in the plurality of surface units are arranged in series and spaced along the length of the telemetry cable and are attached to the telemetry cable to transfer data through the telemetry cable. This distance between surface units can be constant along the length of the telemetry cable, can vary from surface unit to surface unit or can be field adjustable. Therefore, the resulting length of telemetry cable and surface units is easily stored and deployed.

In one embodiment, the seismic data acquisition system of the claims includes at least one power cable 106 in communication with the recording unit and each one of the plurality of surface units to supply power to the plurality of surface units. Alternatively the seismic data acquisition system can include a plurality of power cables. The power cable can be separate from or integrated with the telemetry cable. Suitable arrangements between the power cable and the surface units are the same as for those between the telemetry cable and the surface units.

In general, the seismic data acquisition system includes circuitry within the recording unit, surface units, wireless field digitizer unit (WFDU), telemetry cable and power cable to mimic the operation of a convention field digitizer unit (FDU), maintaining the telemetry and power links with adjacent FDUs even in the event of a localized fault of a given surface unit or WFDU.

Figure 2:
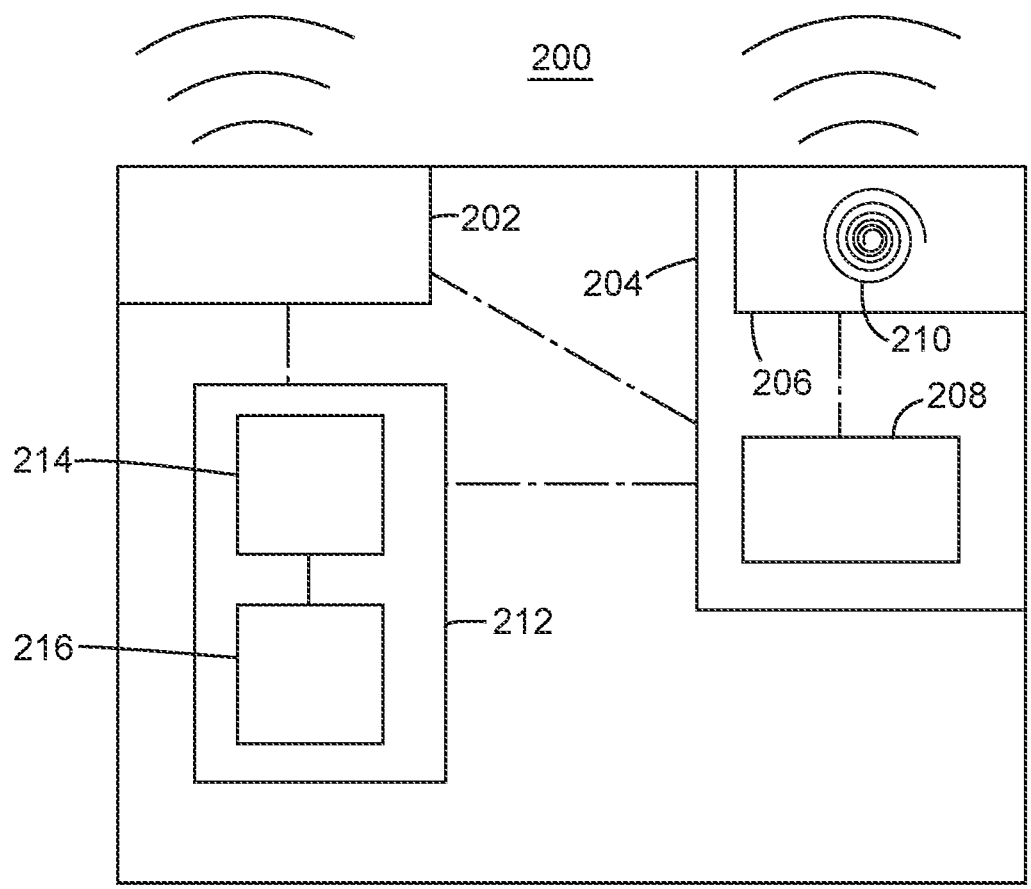
FIG. 2 is a schematic representation of an embodiment of a wireless field digitizer unit in accordance with the present invention.

Referring to FIG. 2, an exemplary embodiment of a wireless field digitizer unit (WFDU) 200 is illustrated. The wireless field digitizer unit includes a seismic sensor unit 212 that is configured to output at least one digital channel of seismic data. Alternatively, the seismic sensor unit can output two, three or more digital channels of seismic data. In one embodiment, the seismic sensor unit includes an analogue seismic sensor 216 that is in communication with a digitizer unit 214. The digitizer unit converts the analogue seismic data output from the analogue seismic sensor to the one or more digital channels of seismic data. In one embodiment, the seismic sensor unit includes three analogue seismic sensors arranged along three orthogonal axes. All three seismic sensors are in communication with the digitizer unit and can be recorded as three separate signals. In one embodiment, the analog sensors are capable of measuring gravitational effect and the digitizer resolves the three resulting analogue signals into a single or more digital channels of seismic data. In one embodiment, tilt sensors are used to correct signals from the analogue sensors and for correcting misalignment for analog sensors. This arrangement provides for self-correcting of any misalignment of the deployed wireless field digitizer unit, as the digitizer unit, using gravity as a reference can resolve the three axis data to a single digital signal along a vertical axis. Suitable analogue seismic sensors include, but are not limited to, geophones.

In addition to analogue sensors, the seismic sensor unit can contain digital seismic sensors. This eliminates the need for the digitizer unit to convert analogue signals to digital signals. These digital seismic sensors include single component and multiple component digital accelerometers. Suitable digital accelerometers include DSU1 and DSU3, which are commercially available from Sercel of Carquefou, France. In one embodiment, the seismic sensor unit includes a single digital accelerometer. Alternatively, the seismic sensor unit includes three digital accelerometers, or a three component digital accelerometer, where the three digital accelerometers are arranged along three orthogonal axes. The seismic sensor unit performs alignment correction for the wireless field digitizer about the three orthogonal axes and outputs the single digital channel of seismic data. In this embodiment, the seismic sensor unit also includes the circuitry necessary to resolve the outputs of the three digital accelerometers into the single digital channel of seismic data. This circuitry provides electrical translation of the outputs of the three digital accelerometers into the vertical channel.

The wireless field digitizer unit also includes a wireless communication module 202 that is in communication with the seismic sensor unit 212. The wireless communication module comprises a self-connecting and self-pairing wireless communication module, i.e., the wireless communication module can connect and transmit data without the need for operator interaction. In one embodiment, the wireless communication module has at least one data communication channel. Suitable data transfer bandwidths for the wireless communication module are up to about 16 KB/sec at about a 2 ms sample rate (SR). The wireless communication module has a transmission range of up to about 1 meter. Suitable wireless communication modules include, but are not limited to, a radio wave communication module, an ultrasonic communication module, an inductive coupling communication module, an optical communication module, a cellular network communication module or an acoustic communication module.

Since the transmission distances being used are up to about 1 m, extremely low powered wireless communication technologies can be used. In addition, since the wireless data link is responsible for a single data channel, the required bandwidth is quite reasonable (16 KB/sec @ 2 ms SR). Therefore, options for the wireless communication module include WiFi (802.11x), Bluetooth, ZigBee, Dash7, Wireless USB, DECT, Transfer Jet™, Wireless HD, IEEE 802.15.x, EnOcean, UWB, Inductive Data Transfer, Ultrasonic and Optical.

The wireless field digitizer unit also includes a power supply mechanism 204 in communication with the seismic sensor unit and wireless communication module. This power supply mechanism is sufficient to supply all required power of the wireless field digitizer. Preferably, the power supply mechanism is a wireless power transfer mechanism, for example, an electromagnetic energy transfer mechanism. Suitable electromagnetic wireless energy transfer mechanisms include non-resonant inductive coupling mechanism and resonant inductive coupling. While basic inductive coupling is a viable wireless power transmission technique for use in the field equipment, resonant inductive coupling, for example highly resonant wireless power transfer, (HR-WPT) is preferred. Resonant wireless power transfer uses two matched, magnetically coupled resonant circuits to efficiently transfer energy over distances of up to about 30 cm (12 Inches) and through a variety of geophysical substrates. In addition, the pair of resonant circuits need only be placed in proximity rather than in direct contact or coaxially engaged in order for power to be efficiently transferred.

Figure 3:
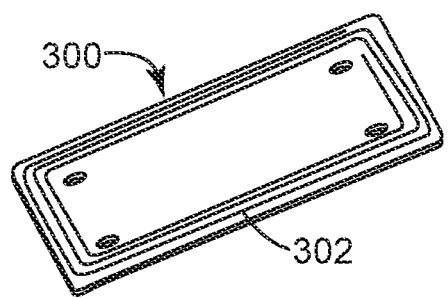
FIG. 3 is a top perspective view of an embodiment of a coil etched on a printed circuited board.

In one embodiment, the electromagnetic transfer mechanism includes at least one coil 210. The coil can be a wound wire coil or as illustrated in FIG. 3, the coil 302 is etched on a printed circuit board (PCB) 300. Suitable methods for etching coils on printed circuits boards are known and available in the art. A single coil can be etched on a given PCB or multiple coils can be etched on a single PCB. The PCB can be any desired shape to fit with the physical dimensions and arrangements of the wireless field digitizer unit. In one embodiment, the PCB is rectangular.

Returning to FIG. 2, the electromagnetic transfer mechanism can include a plurality of coils arranged with divergent magnetic axes. As the use of a seismic data unit that eliminates concerns over the orientation of the wireless field digitizer unit through the use of multi-component seismic sensors, the wireless electromagnetic energy transfer system is also arranged to receive energy from a variety of vectors. This is facilitated by the use of multiple receiver coils with some amount of offset.

Overall, the wireless power transfer mechanism has a range for power transmission of up to about 1 m. In one embodiment, the power supply mechanism includes a battery 208. Preferably, the wireless power transfer mechanism is in communication with the battery to charge the battery continuously.

Figure 4:
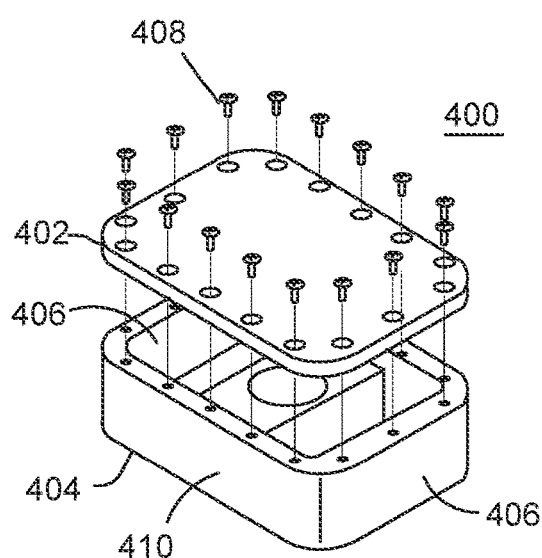
FIG. 4 is an exploded top perspective view of an embodiment of a housing for the wireless field digitizer unit.
Figure 5:
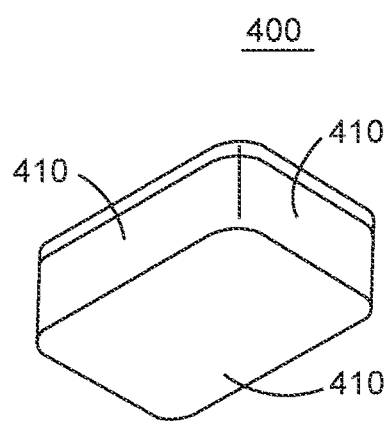
FIG. 5 is a bottom perspective view of the housing of FIG. 4.

All of the components of the wireless field digitizer unit, e.g., the seismic sensor unit, wireless communication module and power supply mechanism are disposed within a housing that is suitably rugged and durable for the machinery used to deploy the wireless field digitizer unit and the environment in which the field digitizer unit is deployed. Referring to FIGS. 4 and 5, in one embodiment, the housing 400 is arranged as a rectangular box having a plurality of flat sides 410. The housing is a two piece housing having a top 402 attached to a bottom 404 using a plurality of fasteners 408 such as screws. The bottom includes one or more cavities 406 to hold the components of the wireless field digitizer unit. This arrangement of the housing can be referred to as a flatpack.

Figure 6:
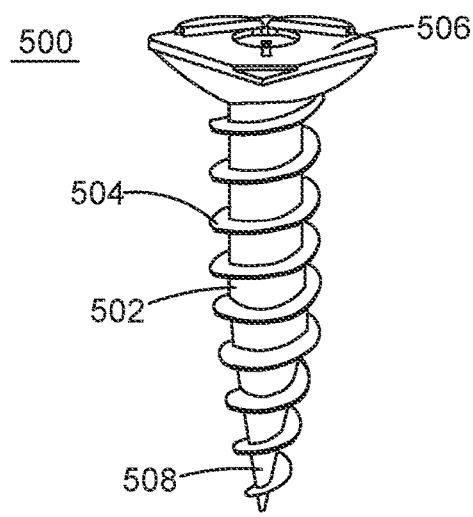
FIG. 6 is an elevation view of another embodiment of a housing for the wireless field digitizer unit.
Figure 7:
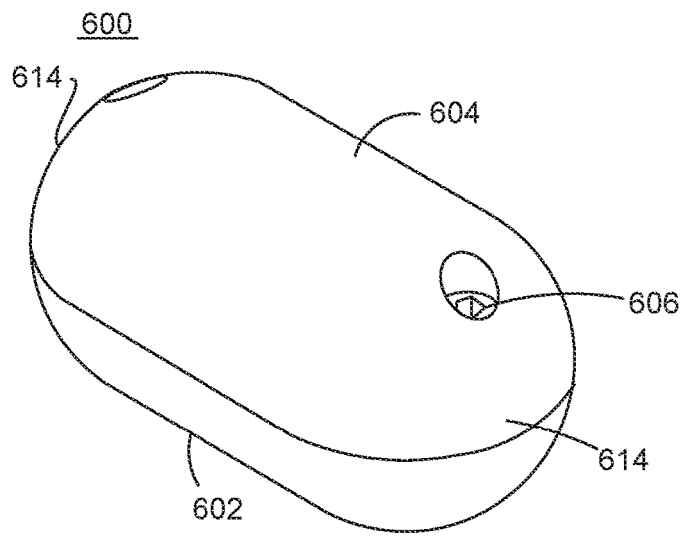
FIG. 7 is a top perspective view of another embodiment of a housing for the wireless field digitizer unit.
Figure 8:
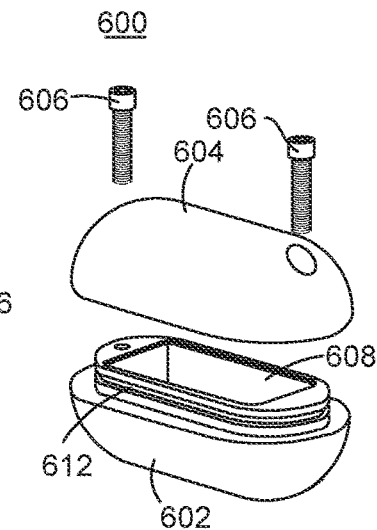
FIG. 8 is an exploded top perspective view of the housing of FIG. 7.
Figure 9:
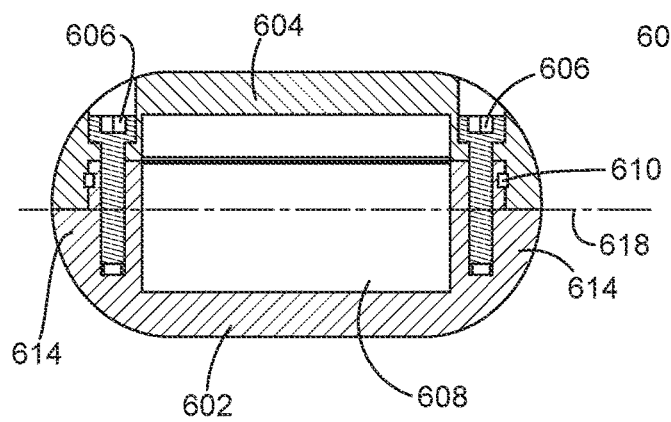
FIG. 9 is cutaway view of the housing of FIG. 7.
Figure 10:
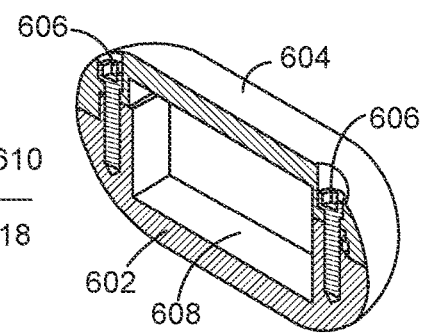
FIG. 10 is a perspective view of the cutaway view of FIG. 9.

Referring to FIG. 6, in another embodiment, the housing 500 is arranged as a sandscrew. In this embodiment, the housing includes a cylinder 502 or cylindrical body and at least one helical ridge 504 extending along a length of the cylinder. The cross-sectional diameter of the cylinder can be constant along its length, or the cylinder can taper to one end 508. In addition, multiple helical ridges can run along the length of the cylinder. The components of the wireless field digitizer unit can be contained within the cylinder. Alternatively, the components are attached to an end 506 of the housing. This housing embodiment provides additional physical coupling between the sensor and the ground resulting from the large surface area of the helical ridge and the tension screwing such a device into a subsurface such as sand can produce. This increased physical ground to sensor interface decreases relative movement between the ground and the sensor. When the sensor moves the same amount as the ground, the coupling of the seismic data from the ground into the sensor is improved.

Preferably, the housing is arranged to take advantage of existing implements for the automation of deployment. In some circumstances the flatpack sandscrew housing arrangements may not be optimal. Referring to FIGS. 7-10, in one embodiment, the housing 600 is a cylinder having two hemispherical ends 614. This forms an elongated or "potato" shape for the housing. The housing is again a two part housing having a top 604 and a bottom 602 secured together by two or more removable mechanical fasteners 606, for example screws. An o-ring 610 fits into a groove 612 on the bottom 602 to form a seal between the two portions of the housing. A cavity 608 is defined within the housing to hold all of the components of the wireless field digitizer unit.

As the orientation of the wireless field digitizer unit in three dimensional space when deployed can vary, arrangements of coils for wireless power transfer where the magnetic axes of the coils are divergent and extend along different vectors radially out from an axis 618 running along the length of the housing are desired. In one embodiment, at least three coils arranged with divergent magnetic axes. Alternatively, four coils are provided, each etched onto a rectangular PCB. The four PCBs are arranged, for example, as a rectangular box within the cavity 608.

In one embodiment, the housing is a sphere. In this embodiment, the power supply mechanism contains six coils. Each coil is disposed on a printed circuit board, and the printed circuit boards arranged as a rectangular box within the sphere. In general, suitable housings can be air tight or water tight housings. Additional protection and ruggedness can be provided for the components within the housing by potting one or more of those components in epoxy.

Figure 11:
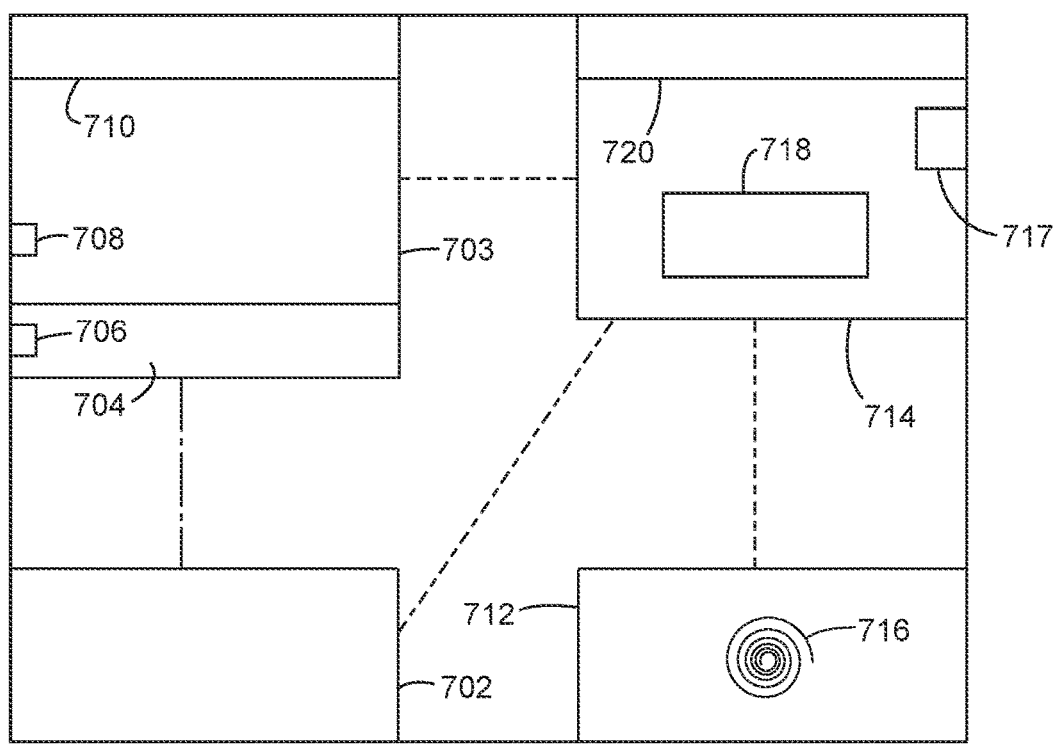
FIG. 11 is a schematic view of an embodiment of a surface unit in accordance with the present invention.

The ground equipment in the seismic data acquisition system also includes the surface units that are mated to one or more of the wireless field digitizer units. Referring to FIG. 11, an exemplary embodiment of the surface unit 700 includes a first wireless communication module 702 configured to communication with a second wireless communication module in one or more of the wireless field digitizer units to exchange digital data between the first and second wireless communication modules. Suitable arrangements for the first wireless communication module are the same as for the wireless communication modules in the wireless field digitizer units.

In one embodiment, the surface unit includes a data communication module 703 in communication with the first wireless communication module for communicating the seismic data obtained from the wireless field digitizer units to the recording unit. This can be a wired data communication module, and the surface unit can include a communication port 708 to connect to the telemetry cable. In one embodiment, the data communication module of the surface unit includes an electro-optic converter 704 in communication with first wireless communication module. This converts the digital seismic data to optical data, and the data communication module of the surface unit includes an optical port 706 to connect with a fiber optic telemetry cable. The communication between the surface unit and the recording unit can also be a wireless communication link. In one embodiment, the data communication module of the surface unit includes a cellular communication module 710 in communication with first wireless communication module.

The surface unit includes a wireless power supply mechanism 712 that includes at least one power supply mechanism transmitter coil 716. This transmitter coil is arranged to inductively couple with one or more power supply mechanism receiver coils in one or more of the wireless field digitizer units. The power supply mechanism receiver coils magnetically couple to the power supply mechanism transmitter coil to transmit electrical energy wirelessly from the surface unit to one or more wireless field digitizers. Preferably, the power supply mechanism transmitter coil and the power supply mechanism receiver coils are magnetically coupled coils tuned to resonate at a common frequency.

Figure 12:
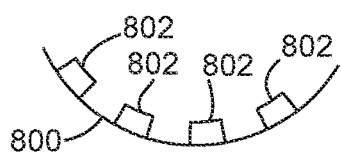
FIG. 12 is a schematic representation of an embodiment of a bottom plate of the surface unit with a plurality of coils attached.
Figure 13:
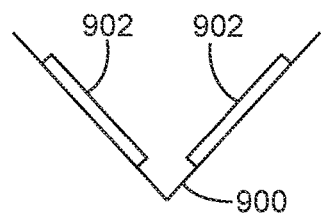
FIG. 13 is a schematic representation of another embodiment of a bottom plate of the surface unit with a plurality of coils attached.

In one embodiment, the surface unit includes a plurality of power supply mechanism transmitter coils arranged with divergent magnetic axes. As illustrated in FIG. 12, a bottom 800 of the surface unit would come into contact with the ground is arranged as a rounded to hemispherical surface, and the plurality of power supply mechanism transmitter coils 802 are arranged around this rounded bottom surface. As illustrated in FIG. 13, a bottom 900 of the surface unit would come into contact with the ground is arranged as a slanted surface, and the plurality of power supply mechanism transmitter coils 902 are arranged around this slanted bottom surface.

Returning to FIG. 11, the surface unit also includes a power source 714 in communication with the power supply mechanism transmitter coil 716 to supply continuous power to the power supply mechanism transmitter coil. In one embodiment, the power source is a wired power source and includes a power connection 717 for connecting with the power cable from the recording unit. In one embodiment, the power source can also include a battery 718 to store power and maintain telemetry, power in the wireless field digitizer units and data continuity even in the event of loss of power from the wired power source. In one embodiment, the surface unit is a wireless or cableless unit rather than a telemetry cable based system, for example, a self-contained, autonomous standalone node, for example, a Sercel Unite, which is commercially available from Sercel, Inc. of Carquefou, France.

The surface units and wireless field digitizer units can also include data storage or memory units, such as non-volatile data storage, to assist in maintaining data continuity in the event of a power failure. Data storage also facilitates the use of data upload or data dumps at discrete time periods, for example, in response to an interrogation from the recording unit, as opposed to a continuous streaming of data. In one embodiment, the surface unit further includes at least one photovoltaic cell 720 in communication with the battery to charge the battery continuously.

Figure 14:
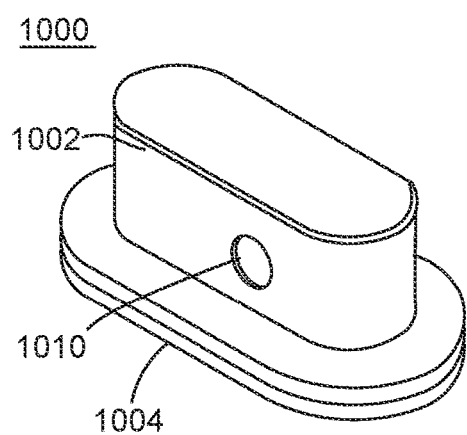
FIG. 14 is a top perspective view of an embodiment of a housing for the surface unit.
Figure 15:
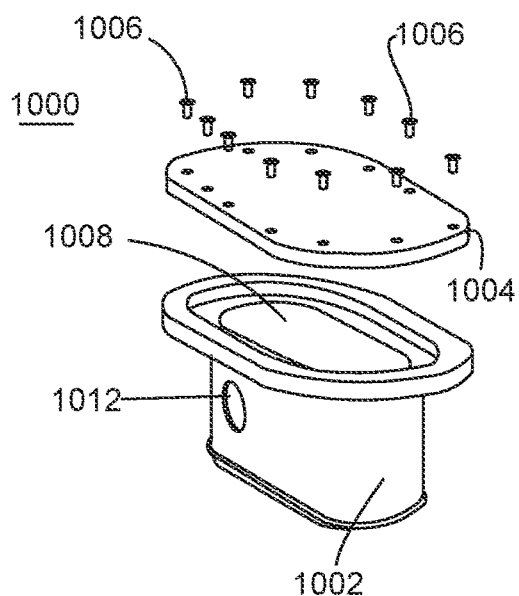
FIG. 15 is an exploded bottom perspective view of the embodiment of the housing of FIG. 14.
Figure 16:
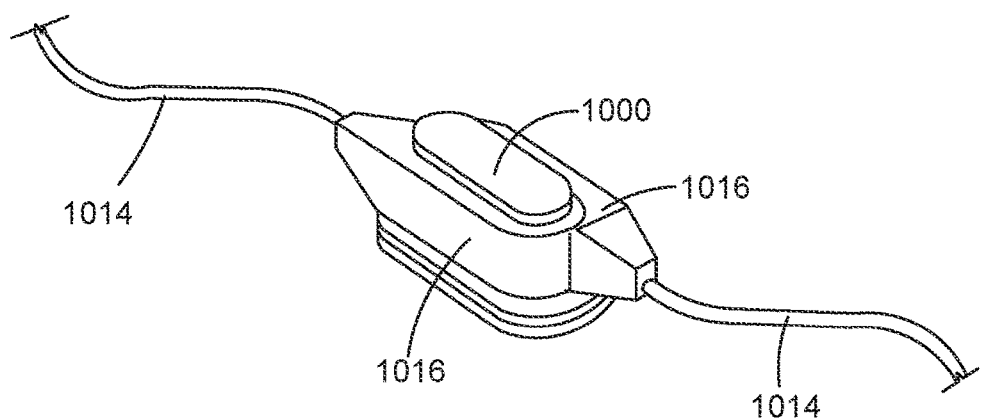
FIG. 16 is a perspective view of an embodiment of a surface unit attached to a telemetry and power cable.

Referring to FIGS. 14-16, in one exemplary embodiment the surface unit includes a two piece housing 1000 having a bottom plate 1004 attached to a main body 1002 using a plurality of mechanical fasteners 1006 such as screws. The bottom plate can be flat, curved, rounded or slanted. The main body 1002 includes a first plug port 1010 and a second plug port 1012 for accepting input connections from the telemetry and power cables 1014, which are illustrated as a combined cable. In one embodiment, a pair of connectors 1016 having a shape that is complementary to the shape of the housing is provided to connect the combined cable to the housing.

Figure 17:
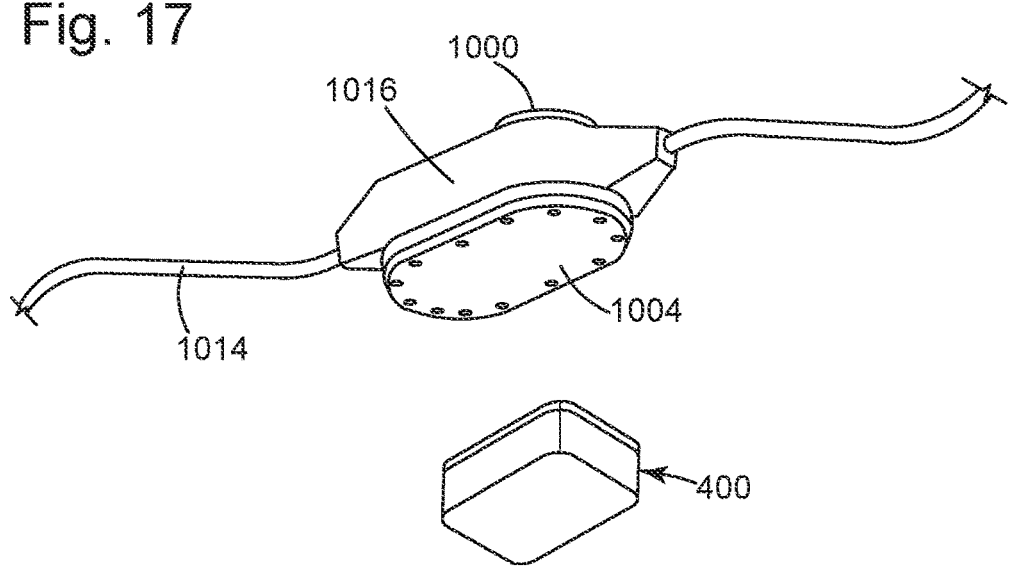
FIG. 17 is a bottom perspective view of an embodiment of ground equipment.
Figure 18:
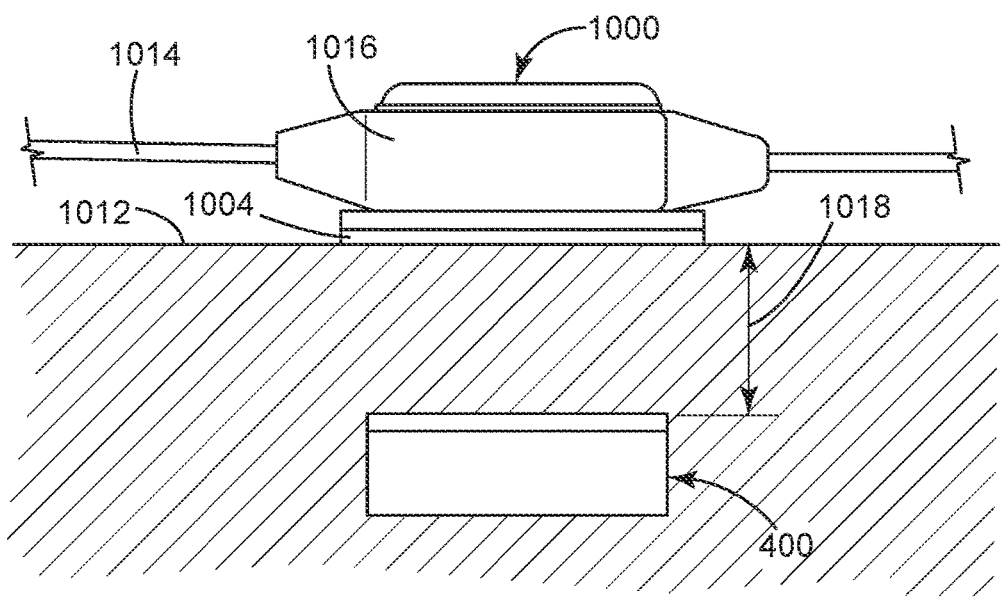
FIG. 18 is an elevation view of an embodiment of ground equipment deployed in the ground.

Referring to FIGS. 17 and 18, the ground equipment is provided with the surface unit in its housing 1000 and the wireless field digitizer unit in its housing 400. The wireless field digitizer unit is placed the desired distance 1018 below the surface 1012 of the ground. And the surface unit housing 1000 is placed over the wireless field digitizer unit 400 with the bottom plate 1004 in contact with the surface of the ground. The surface unit does not have to be placed directly over the wireless field digitizer unit, and can be moved in two directions over the surface of the ground while maintaining telemetry and power transfer with the wireless field digitizer unit. In addition, the wireless field digitizer unit does not have to be oriented perfectly with respect to the vertical and horizontal axis as the electronics can compensate for alignment about these axes.

Figure 19:
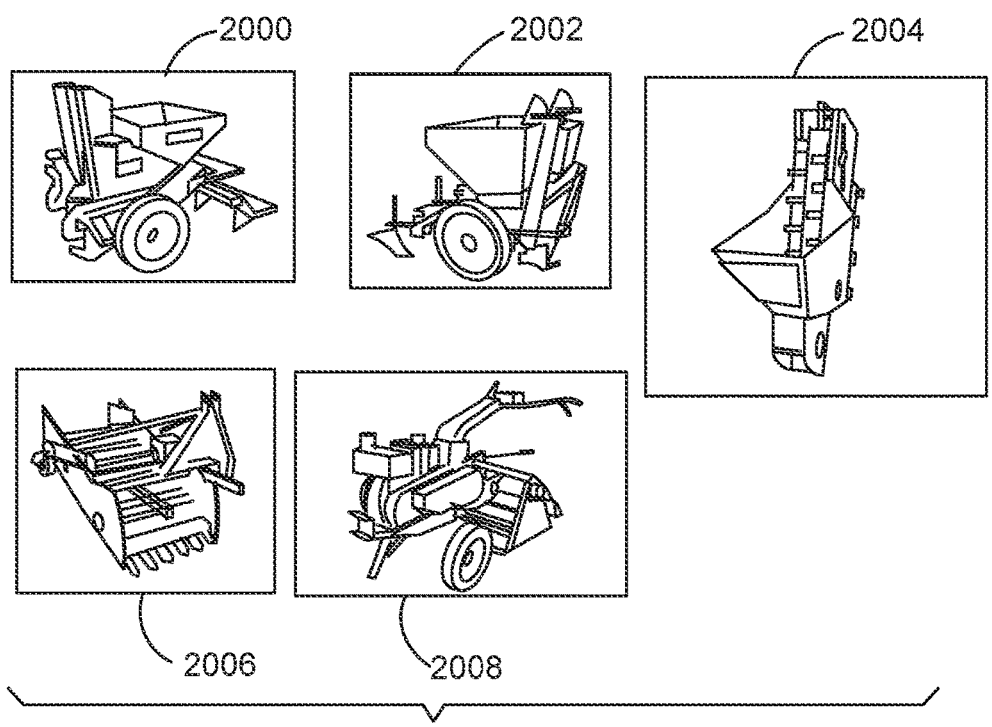
FIG. 19 is an illustration of conventional agricultural equipment to be used to deploy seismic acquisition system.

The seismic data acquisition system includes mechanized deployment and recovery equipment to insert each one of the plurality of wireless field digitizer units the desired distance below ground and to remove the plurality of wireless field digitizer units from the desired distance below ground. In one embodiment, this desired distance is up to about 30 cm or alternatively up to about 1 meter. Referring to FIG. 19, in one embodiment, the mechanized deployment and recovery equipment is conventional agricultural planting and harvesting equipment 2000-2008, such as potato planting and harvesting equipment. Therefore, a potato shaped or elongated housing is desired to work with this type of equipment. In this embodiment, the housing is the cylinder having two hemispherical ends or a sphere. To eliminate concern over the orientation of the wireless field digitizer unit and the surface units, these units are arranged to deliver and receive the resonant wireless power energy from a variety of vectors. Given that a potato is cylindrical in shape, three coils are provided in the wireless filed digitizer unit in a triangular or cubic form. Although current potato based farming implements are well suited to the wireless field digitizer unit shape described above, the shape of a sphere can also be used. In this embodiment, the wireless field digitizer unit includes up to six receiver coils, yielding increased sensitivity in multiple orientations. The conventional mechanical agricultural planting and harvesting equipment can be used in their standard arrangement or can be customized to work with the specific size and shape of the housing of the wireless field digitizer unit.

Although the features and elements of the present exemplary embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software, or firmware tangibly embodied in a computer-readable storage medium for execution by a geophysics dedicated computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A wireless field digitizer unit configured to be buried underground, the wireless field digitizer unit comprising:
   a seismic sensor unit configured to output a digital channel of seismic data;
   a wireless communication module in communication with the seismic sensor unit; and
   a power supply mechanism in communication with the seismic sensor unit and wireless communication module, the power supply mechanism sufficient to supply all required power of the wireless field digitizer;
   wherein the wireless communication module communicates the digital channel of seismic data wirelessly to a wired surface unit in a seismic data acquisition system, and the power supply mechanism receives power from the wired surface unit, which is placed on a ground surface at less than 1 m above the wireless field digitizer unit.

2. The wireless field digitizer unit of claim 1, wherein the seismic sensor unit comprises:
   three digital accelerometers arranged along three orthogonal axes, the seismic sensor unit performing alignment correction for the wireless field digitizer about the three orthogonal axes and outputting the single digital channel of seismic data.

3. The wireless field digitizer unit of claim 1, wherein the wireless communication module comprises a self-connecting and self-pairing wireless communication module.

4. The wireless field digitizer unit of claim 1, wherein the wireless communication module comprises a radio wave communication module, an ultrasonic communication module, an inductive coupling communication module, an optical communication module, a cellular network communication module or an acoustic communication module.

5. The wireless field digitizer unit of claim 1, wherein the power supply mechanism comprises a wireless non-resonant inductive coupling mechanism.

6. The wireless field digitizer unit of claim 1, wherein the power supply mechanism comprises a wireless resonant inductive coupling mechanism.

7. The wireless field digitizer unit of claim 6, wherein the wireless resonant inductive coupling mechanism comprises a plurality of coils arranged with divergent magnetic axes.

8. The wireless field digitizer unit of claim 1, wherein the power supply mechanism comprises:
   a battery; and
   a wireless power transfer mechanism in communication with the battery to charge the battery continuously.

9. The wireless field digitizer unit of claim 1, further comprising a housing, at least one of the seismic sensor unit, wireless communication module and the power supply mechanism disposed within the housing.

10. The wireless field digitizer unit of claim 9, wherein the housing comprises a cylinder and at least one helical ridge extending along a length of the cylinder.

11. The wireless field digitizer unit of claim 9, wherein the housing comprises a cylinder having two hemispherical ends.

12. The wireless field digitizer unit of claim 11, wherein the power supply mechanism comprises at least three coils arranged with divergent magnetic axes.

13. The wireless field digitizer unit of claim 9, wherein the housing comprises a sphere and the power supply mechanism comprises six coils, each coil disposed on a printed circuit board, and the printed circuit boards arranged as a rectangular box within the sphere.

14. Ground equipment for use in a seismic data acquisition system, the ground equipment comprising:
   a surface unit that is placed on a ground surface, the surface unit comprising:
      a first wireless communication module; and
      a power supply mechanism transmitter coil; and
   a wireless field digitizer unit that is placed underground less than 1 m under the surface unit, the wireless field digitizer unit comprising:
      a second wireless communication module in communication with the first wireless communication module to exchange digital data between the first and second wireless communication modules; and
      a power supply mechanism receiver coil, the power supply mechanism receiver coil magnetically coupled to the power supply mechanism transmitter coil to transmit electrical energy wirelessly from the surface unit to the wireless field digitizer;
   wherein the wireless field digitizer unit is separate from and physically disconnected from the surface unit.

15. The ground equipment of claim 14, wherein the surface unit further comprises:
   a battery in communication with the power supply mechanism transmitter coil to supply continuous power to the power supply mechanism transmitter coil; and at least one photovoltaic cell in communication with the battery to charge the battery continuously.

16. The ground equipment of claim 14, wherein the surface unit further comprises a plurality of power supply mechanism transmitter coils arranged with divergent magnetic axes and the power supply mechanism transmitter coils and the power supply mechanism receiver coil comprise magnetically coupled coils tuned to resonate at a common frequency.

17. A seismic data acquisition system comprising:
a recording unit to record acquired seismic data;
ground equipment comprising:
    a plurality of surface units, each surface unit being placed on ground surface, in communication with the recording unit and comprising:
        a first wireless communication module; and
        a power supply mechanism transmitter coil; and
    a plurality of wireless field digitizer units, each wireless field digitizing unit being placed underground at less than 1 m from one of the surface units, each of the wireless field digitizer units comprising:
        a seismic sensor unit;
        a second wireless communication module in communication with the seismic sensor unit and one of the first wireless communication modules to exchange digital data between the first and second wireless communication modules; and
        a power supply mechanism receiver coil, the power supply mechanism receiver coil magnetically coupled to the power supply mechanism transmitter coil in at least one of the surface units to transmit electrical energy wirelessly from the surface unit to the wireless field digitizer.

18. The seismic data acquisition system of claim 17, further comprising:
at least one telemetry cable in communication with the recording unit and each one of the plurality of surface units to communicate data from the surface units to the recording unit; and
at least one power cable in communication with the recording unit and each one of the plurality of surface units to supply power to the plurality of surface units.

19. The seismic data acquisition system of claim 17, wherein a ratio of surface units to wireless field digitizer units is less than 1:1.

20. The seismic data acquisition system of claim 17, further comprising mechanized deployment and recovery equipment to insert each one of the plurality of wireless field digitizer units at a desired depth under the ground surface and to remove the plurality of wireless field digitizer units from the desired distance.

* * * * *